United States Patent [19]

Seesink

[11] Patent Number: 5,504,446
[45] Date of Patent: Apr. 2, 1996

[54] AC VOLTAGE CLIPPER IN MOS-TECHNOLOGY

[75] Inventor: Petrus H. Seesink, Eindhoven, Netherlands

[73] Assignee: Sierra Semiconductor B.V., 's-Hertogenbosch, Netherlands

[21] Appl. No.: 94,022

[22] PCT Filed: Jun. 15, 1992

[86] PCT No.: PCT/NL92/00105

§ 371 Date: Jul. 26, 1993

§ 102(e) Date: Jul. 26, 1993

[87] PCT Pub. No.: WO92/22950

PCT Pub. Date: Dec. 23, 1992

[30] Foreign Application Priority Data

Jun. 17, 1991 [NL] Netherlands .................... 9101044

[51] Int. Cl.⁶ .................... H03K 5/08; H03K 5/02; H03K 12/00
[52] U.S. Cl. .................... 327/309; 327/327; 327/328; 327/180; 327/184
[58] Field of Search .................... 327/309, 327, 327/328, 180, 184, 530, 531, 535, 537, 538, 104, 330, 423, 424, 494, 588, 428; 363/34, 37, 70, 127

[56] References Cited

U.S. PATENT DOCUMENTS 3,571,660  3/1971  Phillips .................... 317/16
3,593,112  7/1971  Coats .................... 323/34
4,663,547  5/1987  Baliga et al. .................... 327/428
4,811,191  3/1989  Miller .................... 363/127
4,819,147  4/1989  Bingham .................... 363/127

FOREIGN PATENT DOCUMENTS 0173108  3/1986  European Pat. Off. .
3806288  9/1989  Germany .

Primary Examiner—Timothy P. Callahan
Assistant Examiner—Trong Phan
Attorney, Agent, or Firm—Young & Thompson

[57] ABSTRACT

AC voltage clipper for a MOS-circuit having two input terminals (In1, In2) receiving an ac supply voltage, wherein one input terminal (In1) is connected to a point of common voltage through a first MOS-transistor (MCL41) and the other input terminal (In2) is connected to said point of common voltage through a second MOS-transistor (MCL42). The gates of MOS-transistors (MCL41, MCL42) are connected to each other and receive a gate voltage (Vg4) of a control circuit (MCL2, MCL3, DCL11, DCL12), in such a way that both transistors (MCL41, MCL42) will conduct when the absolute value of the ac supply voltage, being applied as an input signal to the control circuit (MCL2, MCL3, DCL11, DCL12) exceeds a predetermined threshold value.

10 Claims, 2 Drawing Sheets

5,504,446

AC VOLTAGE CLIPPER IN MOS-TECHNOLOGY

BACKGROUND OF THE INVENTION

The invention applies to an ac voltage clipper to be used in MOS-circuits with an ac power supply. In that case the ac voltage has to be rectified by a rectifier. To protect the rectifier against damage caused by ac over-voltages at its input, it is necessary to limit the ac voltage by a clipper, if said voltage exceeds a predetermined threshold. The clipper should especially be applied in circuits where an ac voltage of highly varying amplitude is provided e.g. in the case of a LC-resonator influenced by an ac magnetic field.

SUMMARY OF THE INVENTION

The object of the invention is to provide an ac voltage clipper that has a short response time and a low current consumption when the clipper is not activated.

The ac voltage clipper according to the invention therefore is characterized in that the MOS-circuit has two input terminals which receive an ac supply voltage, which input terminals are each connected to one of two input terminals of the ac voltage clipper, the first input terminal of which is connected to a point of common voltage through a first MOS-transistor and the other input terminal is connected to said point of common voltage through a second MOS-transistor, the gates of the first and second MOS-transistors being connected to each other and receiving a gate voltage of a control circuit which gate voltage depends on the absolute value of the ac supply voltage, in such a way that when this absolute value exceeds a predetermined threshold value the first and second MOS-transistor are forced to be conductive.

In addition to a very short response time (ns range) and an extremely low current consumption (nA range) when the clipper is not activated, the ac voltage clipper according to the invention offers the advantage of a first order behaviour, a high current sinking capability (above 100 mA) and a small chip area. This is an unique combination of features for an ac voltage clipper in CMOS-technology

BRIEF DESCRIPTION OF THE DRAWINGS

The invention will be further explained with reference to the drawings, in which

FIGS. 2b and 2c show alternative elements for one element of the arrangement according to FIG. 2a.

FIG. 3 shows a rectifier converting an ac voltage, provided between the input terminals In1 and In2, into a dc voltage VDDUNS.

DESCRIPTION OF THE PREFERRED EMBODIMENTS

Since the rectifier itself is not part of the present invention, a detailed description thereof will be omitted.

Figure 3:
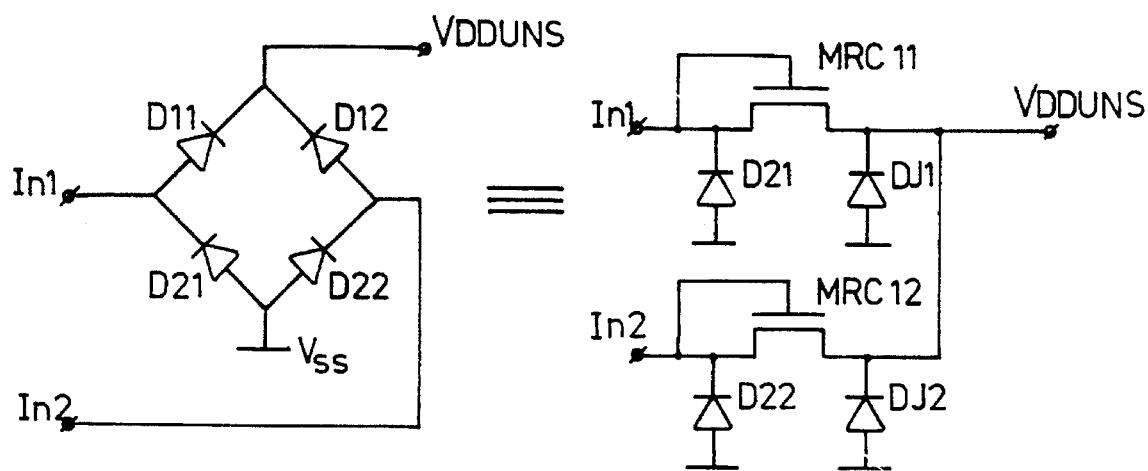
FIG. 3 shows the connection of a rectifier to a clipper according to the invention.
Figure 4:
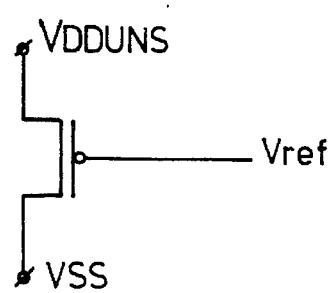
FIG. 4 shows a clipper to be connected to the output of the rectifier according to FIG. 3.

To protect the rectifier against too high ac voltages at its input terminals, basically the output voltage of the rectifier can be simply limited with a single MOS-transistor, as is demonstrated in FIG. 4. However, MOS-bridge-rectifiers, as the one shown in FIG. 3, often have a rather large internal resistance, so that this kind of clipper still may result in high voltage differences and is therefore not efficient.

The best way of voltage clipping is to limit the ac voltage directly at the input of the rectifier. For this reason the circuit of FIG. 1 has been designed. In the clipper circuit according to the invention input In1' (which is connected to In1) is connected to the point of common voltage VSS through a NMOS-transistor MCL41, while input In2' (which is connected to In2) is connected to the point of common voltage VSS through a NMOS-transistor MCL42 (see FIG. 3). The gates of transistors MCL41 and MCL42 are connected to each other and through a depletion MOS-transistor MCL3, which is in "diode" configuration, they are connected to the voltage VSS. MOS-transistor MCL3 has a lower threshold voltage than the MOS-transistors MCL41 and MCL42. Input In1' is connected to the gate of transistors MCL41 and MCL42 through a diode DCL11 and a PMOS-transistor MCL2, while input In2' is connected to the point of connection of the diode DCL11 and PMOS-transistor MCL2 through a diode DCL12. The gate of PMOS-transistor MCL2 receives a reference voltage Vref. If no depletion MOS transistor is available MOS-transistor MCL3 can be replaced by either a current source Ic, as shown in FIG. 2b, or a resistor R, as shown in FIG. 2c. The possibility of such a replacement has been indicated in FIG. 2a by a dot and dash circle line around MOS transistor MCL3. In fact, diodes DCL11 and DCL12, MOS-transistor MCL2 and MOS-transistor MCL3 (or a resistor or current source instead) constitute a control circuit for the gate voltages of MOS-transistors MCL41 and MCL42.

The circuit of FIG. 1 functions as follows.
If:

$$|V(In1)-V(In2)|<Vref+|Vth\ MCL2|+Vdf$$

where:
|Vth MCL2|=absolute value of the threshold voltage of MCL2
Vdf=forward biased voltage drop of DCL11 or DCL12
then the current through DCL11/DCL12, MCL2 and MCL3 approximately equals zero. Since MCL3 is a depletion MOS-transistor (and therefore may conduct current without a biasing gate voltage) and the current through MCL3 is very small, the voltage drop of MCL3 will be very small. Therefore, the gate voltages of MCL41 and MCL42 is too low for MCL41 and MCL42 to conduct. However, as soon as $$|V(In1)-V(In2)|>Vref=|Vth\ MCL2|+Vdf$$

DCL11/DCL12, MCL2 and MCL3 will conduct current. MCL3 is designed in such a way—very low ratio of channel width to channel length (W/L<<1)—that already a small current increase through MCL3 will be enough to generate a strong voltage increase across MCL3. Therefore, the gate voltages of MCL41 and MCL42 will increase very fast, forcing them into conduction and limiting voltage |V(In1)−V(In2)|. If MCL41 and MCL42 have a very high ratio of channel width to channel length (W/L>>1), then |V(In1)−V(In2)| is limited at the value of vref+|VthMCL2|+Vdf plus a small voltage (of about 100 mV), which is required to drive a small current through DCL11/DCL12 and MCL2. The clipper has a high current sinking capacity: above 100 mA is easily obtained. The response time of the clipper is short, varying between some ns to some tens of ns, depending on the circuit dimensions.

The clipper reaches its maximum current sinking capacity when the gate voltages of MCL41 and MCL42 reach the value of Vref=|VthMCL2|. By varying the value of Vref the maximum current sinking capacity of the clipper may be varied.

Figure 2A:
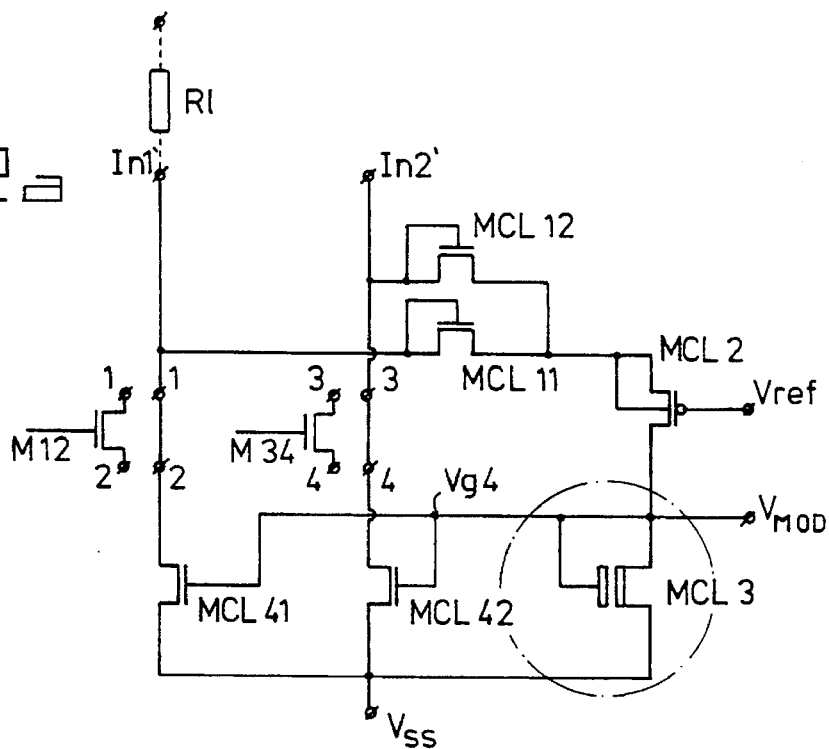
FIG. 2a shows the ac voltage clipper of FIG. 1 in CMOS-technology.

An interesting application of the clipper may be obtained by using the gate voltage Vg4 of MOS-transistors MCL41 and MCL42 as a modulation signal Vmod, available on an additional output terminal connected to the gates of MOS-transistors MCL41 and MCL42 (as e.g. shown in FIG. 2a). This is possible because the gate voltage Vg4 depends on the amplitude of the input signal |V(In1)–V(In2)|.

Figure 1:
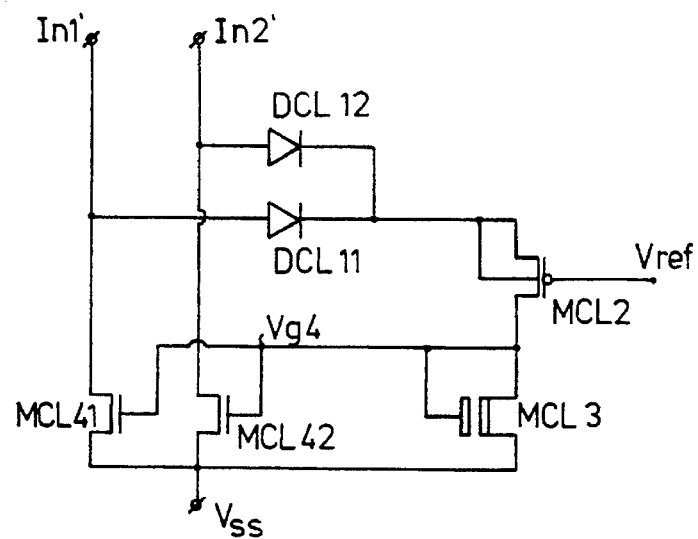
FIG. 1 shows an ac voltage clipper according to the invention.
Figure 2B:
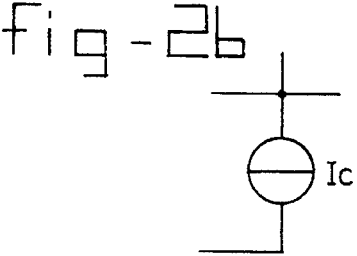
Figure 2C:
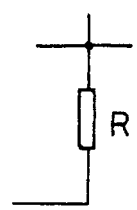

FIG. 2A shows an embodiment of the circuit of FIG. 1 in CMOS-technology, in which the diodes DCL11 and DCL12 are realized as diode connected MOS-transistors MCL11 and MCL12. The reference voltage Vref may for instance equal dc voltage VDD, VDD being a stabilized power supply voltage derived from VDDUNS through a voltage regulator.

It is to be noted that the proposed circuit has very well defined starting characteristics. As long as Vref=VDD=0 at least a double threshold voltage is necessary to activate the clipper. In case of a supply voltage rising too fast the clipper will therefore be directly activated, even if the power supply voltage is not yet present (VDD≈0). If the clipper is activated there always remains a well defined "overtens", i.e. the threshold voltage of MCL2 to pass enough energy to the rectifier. This guarantees that the clipper will never sink all the energy from the rectifier, which would prevent the other circuits on the semiconductor chip from receiving supply voltage.

If a protection of the transistors MCL41 and MCL42 is necessary, an additional MOS-transistor (M12, M34) may be arranged between points 1 and 2, and 3 and 4 respectively (compare FIG. 2a), the gates of which are connected to a predetermined voltage, for instance, that of the point of connection between MCL11/MCL12 and MCL2.

Application of the clipper is not limited to the protection of rectifiers. It may be applied everywhere where the level of an ac voltage can be limited by current sinking. For instance, this may be the case with an ac voltage source from a LC-resonator, which is being influenced by an ac magnetic field. Also, the device according to the invention may be applied to a usual ac power supply, such as the mains. However, in that case in at least one of the cables between the mains and the input terminals In1 and In2 a current limiting resistor is to be installed. Such a current limiting resistor R1 is schematically shown in FIG. 2a, connected to terminal In1' by a dotted line, but it could be connected to terminal In2' instead.

It will be evident that, where in the Figures and the description PMOS and NMOS-transistors are mentioned, also a polarity-reversed embodiment may be applied by commonly known modifications of the dc voltages, the current direction of the diodes, etc.

I claim:

1. An AC voltage clipper for a MOS circuit, said MOS circuit comprising a first (In1) and a second (In2) input terminal to which, in use, an AC supply voltage (V(In1)–V(In2)) is applied, the first (In1) and second (In2) input terminal, respectively, being connected to a first (In1') and a second (In2') clipper input terminal of the AC voltage clipper, respectively, the first clipper input terminal (In1') being connected to a point of common voltage (VSS) through a first MOS-transistor (MCL41) and the second clipper input terminal (In2') being connected to said point of common voltage (VSS) through a second MOS-transistor (MCL42), said first and second MOS-transistors (MCL41, MCL42) having gates being connected to each other and receiving a gate voltage (Vg4) of a control circuit (MCL2, MCL3, DCL11/MCL11, DCL12/MCL12) provided with a first and a second control input terminal, respectively, connected to said first (In1') and second (In2') clipper input terminal, respectively, and the control circuit being arranged to cause said gate voltage (Vg4) to depend on the absolute value of the AC supply voltage |V(In1)–V(In2)|, in such a way that when said absolute value |V(In1)–V(In2)| exceeds a predetermined threshold voltage, the first and second MOS-transistors (MCL41, MCL42) are forced to be conductive.

2. An AC voltage clipper according to claim 1, wherein said control circuit comprises at least a third diode connected MOS-transistor (MCL3) connecting the gates of the first (MCL41) and second MOS-transistor (MCL42) to said point of common voltage (VSS).

3. An AC voltage clipper according to claim 2, wherein the third MOS-transistor (MCL3) is a depletion MOS transistor having a lower threshold voltage than said first and second MOS-transistors (MCL41, MCL42).

4. An AC voltage clipper according to claim 1, wherein said control circuit comprises at least one of a resistance and a current source connecting the gates of the first (MCL41) and second (MCL42) MOS-transistor to the point of common voltage (VSS).

5. An AC voltage clipper according to claim 2, wherein the control circuit also comprises a first diode (DCL11), the anode of which is connected to said first clipper input terminal (In1'), a second diode (DCL12) the anode of which is connected to said second clipper input terminal (In2'), the cathodes of said first and said second diodes (DCL11, DCL12) being connected to each other and to the gates of the first (MCL41) and second (MCL42) MOS-transistor through a fourth MOS-transistor (MCL2), said fourth MOS-transistor (MCL2) receiving a predetermined voltage (Vref) at its gate, during operation.

6. An AC voltage clipper according to claim 4, wherein the control circuit also comprises a first diode (DCL11), the anode of which is connected to said first clipper input terminal (In1'), a second diode (DCL12) the anode of which is connected to said second clipper input terminal (In2'), the cathodes of said first and said second diodes (DCL11, DCL12) being connected to each other and to the gates of the first (MCL41) and second (MCL42) MOS-transistor through a fourth MOS-transistor (MCL2), said fourth MOS-transistor (MCL2) receiving a predetermined voltage (Vref) at its gate, during operation.

7. An AC voltage clipper according to claim 1, wherein a fifth MOS-transistor (M12) is arranged between the first MOS-transistor (MCL41) and the first clipper input terminal (In1') and a sixth MOS-transistor (M34) is arranged between the second MOS-transistor (MCL42) and the second clipper input terminal (In2').

8. An AC voltage clipper according to claim 5, wherein W/L<<1 for said third MOS-transistor (MCL3) and W/L>>1 for said first (MCL41), said second (MCL42) and said fourth MOS-transistor (MCL2), where W is the channel width and L is the channel length of the MOS-transistor concerned.

9. An AC voltage clipper according to claim 1, wherein the gates of said first (MCL41) and second (MCL42) provide an output terminal which, in use, provides a modulation signal (Vmod).

10. An AC voltage clipper according to claim 1, wherein AC voltage is derived from the AC supply voltage and a current limiting resistance is arranged between at least one of the two input terminals (In1, In2) and the AC supply voltage.

* * * * *